(12) United States Patent
Itou

(10) Patent No.: US 9,527,184 B2
(45) Date of Patent: Dec. 27, 2016

(54) ROTATION TABLE DEVICE

(71) Applicant: FANUC Corporation, Yamanashi (JP)

(72) Inventor: Tomoya Itou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 107 days.

(21) Appl. No.: 14/631,045

(22) Filed: Feb. 25, 2015

(65) Prior Publication Data

US 2015/0239087 A1    Aug. 27, 2015

(30) Foreign Application Priority Data

Feb. 26, 2014  (JP) .................................. 2014-035442

(51) Int. Cl.
| | | |
|---|---|---|
| B23Q 11/08 | (2006.01) | |
| B23Q 1/25 | (2006.01) | |
| B23Q 11/00 | (2006.01) | |
| B23Q 16/10 | (2006.01) | |

(52) U.S. Cl.
CPC ............ *B23Q 11/0858* (2013.01); *B23Q 1/25* (2013.01); *B23Q 11/0042* (2013.01); *B23Q 11/0883* (2013.01); *B23Q 16/105* (2013.01)

(58) Field of Classification Search
CPC ............. B23Q 11/0042; B23Q 11/0858; B23Q 11/0883; B23Q 16/105; B23Q 1/25
See application file for complete search history.

(56) References Cited

U.S. PATENT DOCUMENTS

| | | | | |
|---|---|---|---|---|
| 4,524,655 A | * | 6/1985 | Waldron ............ | B23Q 11/0042 29/48.5 R |
| 5,385,424 A | * | 1/1995 | Matsumoto ............ | B23Q 1/287 192/110 B |
| 5,487,628 A | * | 1/1996 | Suzuki ............... | B23Q 11/0883 408/56 |
| 2009/0235783 A1 | * | 9/2009 | Duane .................. | B23Q 16/102 74/813 C |
| 2010/0175505 A1 | * | 7/2010 | Tatsuda ................ | B23Q 16/102 74/813 L |
| 2010/0319487 A1 | * | 12/2010 | Tatsuda ................ | B23Q 16/102 74/813 L |

(Continued)

FOREIGN PATENT DOCUMENTS

| | | |
|---|---|---|
| JP | 5-67829 U | 9/1993 |
| JP | 5-318251 A | 12/1993 |

(Continued)

OTHER PUBLICATIONS

Office Action mailed Jun. 30, 2015, corresponding to Japanese patent application No. 2014-035442.

*Primary Examiner* — Joseph J Hail
*Assistant Examiner* — Marc Carlson
(74) *Attorney, Agent, or Firm* — Hauptman Ham, LLP

(57) ABSTRACT

A rotation table device includes a casing, a rotation member, a braking member, a brake disk, and a target braking member, and a pressure adjustment unit that maintains the pressure inside the casing so as to be higher than the atmospheric pressure by air supplied from a purge air supply port, wherein the braking member includes a communication portion formed as a groove or a hole causing an inner space of a contact surface of the brake disk to communicate with an outer space thereof.

3 Claims, 5 Drawing Sheets

(56) References Cited

U.S. PATENT DOCUMENTS

| | | | |
|---|---|---|---|
| 2012/0024644 A1* | 2/2012 | Tatsuda | B23Q 16/105 188/264 B |
| 2014/0326107 A1* | 11/2014 | Itou | B23Q 3/18 74/813 C |
| 2014/0353894 A1* | 12/2014 | DesJardien | B23P 19/10 269/21 |
| 2015/0209928 A1* | 7/2015 | Tezuka | B23Q 16/102 269/63 |

FOREIGN PATENT DOCUMENTS

| | | |
|---|---|---|
| JP | 3013302 B2 | 2/2000 |
| JP | 2001-277074 A | 10/2001 |
| JP | 2012-202484 A | 10/2012 |
| WO | 2013/167260 A1 | 11/2013 |

\* cited by examiner

ROTATION TABLE DEVICE

RELATED APPLICATIONS

The present application claims priority to Japanese Application Number 2014-035442, filed Feb. 26, 2014, the disclosure of which is hereby incorporated by reference herein in its entirety.

BACKGROUND OF THE INVENTION

1. Field of the Invention

The present invention relates to a rotation table provided in a tool machine, and particularly, to a rotation table device with an air purging structure.

2. Description of the Related Art

There is a case in which a cutting fluid used in a tool machine may cause degradation such as swelling or hardening in a synthetic resin material of a seal packing or a coating of a cable. In a rotation table device provided on a table of a tool machine disclosed in JP-A 2012-202484, a problem arises in that an insulation material of an electric component disappears due to the intrusion of a cutting fluid when a seal member formed of a synthetic resin material is degraded. As a general method of preventing this problem, there is known a method of preventing the intrusion of a cutting fluid by supplying air into a casing of a rotation table device so that the pressure inside the casing is set to be higher than the atmospheric pressure at all times.

FIGS. 7 to 10 are views illustrating a rotation table device. FIG. 7 is a view illustrating a cross-section of the rotation table device of the related art (an unclamped state). FIG. 8 is a partially cross-sectional view of FIG. 7. FIG. 9 is a view illustrating a cross-section of the rotation table device of the related art (a clamped state). FIG. 10 is a partially cross-sectional view of FIG. 9.

In general, a rotation table device 100 includes a clamping mechanism. In the clamped state, the clamping mechanism moves a braking member 2 formed as a piston or a diaphragm by a fluid such as air or oil toward a target braking member 4, so that a brake disk 3 fixed to a rotation member 16 is pressed against the target braking member 4 fixed to a casing 15.

In the unclamped state, minute gaps 7 and 8 (see FIG. 8) are respectively formed between the braking member 2 and the brake disk 3 and between the brake disk 3 and the target braking member 4 in a non-contact state, and air for air purging passes through the gaps so that the air purging is performed on the entire area inside the clamping mechanism. As a result, it is possible to prevent the intrusion of the cutting fluid.

However, in the clamped state, the braking member 2 comes into press-contact with the brake disk 3 and the brake disk 3 comes into press-contact with the target braking member 4, so that the gap as the passage of the purge air is blocked. That is, the air for the air purging may not flow forward from the contacting braking member 2, and hence spaces 9 and 10 not receiving the air purging pressure are formed (see FIG. 10). As a result, there is a concern that the cutting fluid may intrude into the space not receiving the air purging pressure.

SUMMARY OF THE INVENTION

Therefore, the invention is made in view of the above-described problems of the related art, and an object of the invention is to provide a rotation table device capable of preventing a cutting fluid from intruding into a casing in an entire area inside the casing of the rotation table device at all times regardless of a clamped state and an unclamped state.

According to the invention, there is provided a rotation table device including: a casing; a rotation member rotatably supported by the casing; a clamping mechanism configured to prohibit the rotation of the rotation member; and a pressure adjustment unit configured to maintain the pressure inside the casing to be higher than the atmospheric pressure by air supplied from a purge air supply port and prevent the intrusion of a cutting fluid, a work attachment portion at one end of the rotation member, the clamping mechanism includes a braking member configured to be operated in the axial direction of the rotation member by air or working oil, a brake disk installed not to be rotatable with respect to the rotation member, and a target braking member fixed to the casing, and the braking member includes a first communication portion formed as a groove or a hole that causes an inner space of a contact surface with respect to the brake disk to communicate with an outer space at the opposite side to the contact surface.

According to the invention, there is provided a rotation table device including: a casing; a rotation member rotatably supported by the casing; a clamping mechanism configured to prohibit the rotation of the rotation member; and a pressure adjustment unit configured to maintain the pressure inside the casing to be higher than the atmospheric pressure by air supplied from a purge air supply port and prevent the intrusion of a cutting fluid, a work attachment portion at one end of the rotation member, and, the clamping mechanism includes a braking member configured to be operated in the axial direction of the rotation member by air or working oil, a brake disk installed not to be rotatable with respect to the rotation member, a target braking member fixed to the casing, and, the brake disk includes a second communication portion formed as a hole or a notch that causes a space near the braking member to communicate with a space near the target braking member of the brake disk.

According to the invention, there is provided a rotation table device including: a casing; a rotation member rotatably supported by the casing; a clamping mechanism configured to prohibit the rotation of the rotation member; and a pressure adjustment unit configured to maintain the pressure inside the casing to be higher than the atmospheric pressure by air supplied from a purge air supply port and prevent the intrusion of a cutting fluid, a work attachment portion at one end of the rotation member, and, the clamping mechanism includes a braking member configured to be operated in the axial direction of the rotation member by air or working oil, a brake disk installed not to be rotatable with respect to the rotation member, and a target braking member fixed to the casing, and, the braking member includes a first communication portion formed as a groove or a hole that causes an inner space of a contact surface with respect to the brake disk to communicate with an outer space at the opposite side to the contact surface, and the brake disk includes a second communication portion formed as a hole or a notch that causes a space near the braking member to communicate with a space near the target braking member of the brake disk.

Since the invention has the above-described configuration, it is possible to provide a rotation table device capable of preventing a cutting fluid from intruding into a casing because the air purging is performed on the entire area all times, regardless of a clamped state and an unclamped state.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Hereinafter, the same reference signs will be given to the components having the same or similar to those of the related art.

Figure 1:
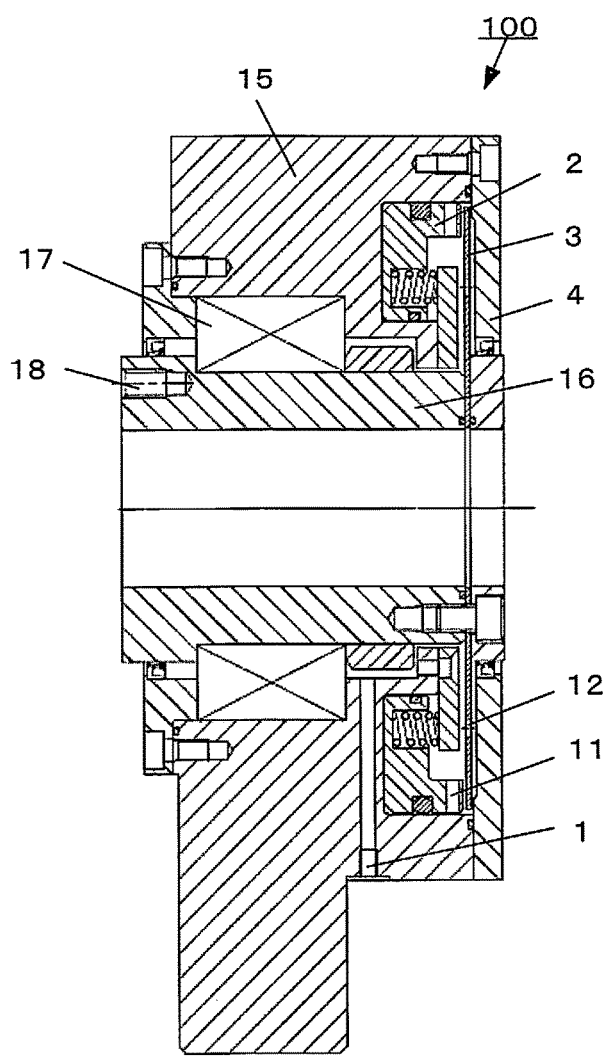
FIG. 1 is a view illustrating a cross-section of a rotation table device of an embodiment of the invention (an unclamped state)

FIG. 1 is a view illustrating a cross-section of a rotation table device of an embodiment of the invention (an unclamped state).

The schematic configuration of a rotation table device 100 will be described with reference to FIG. 1. The configurations of a stator and a rotor of a motor as a drive source of the rotation table device 100 are not illustrated in the drawings. A rotation member 16 is a shaft which fixes a rotor (not illustrated). A braking member 2 is a piston which moves forward and backward in the axial direction of the rotation member 16 by a fluid such as oil or air. A target braking member 4 is a rear plate and is fixed to a casing 15. The rotation member 16 is rotatably supported by a bearing 17 fixed to the casing 15. A brake disk 3 is fixed to one end of the rotation member 16. A bolt hole 18 used to fix a work or a jig for fixing the work is provided in the other end of the rotation member 16.

The clamping mechanism of the rotation table device 100 includes the braking member 2 that is operated in the axial direction of the rotation member by air or working oil, the brake disk 3 that is provided in the rotation member 16 so as not to rotatable relative thereto, and the target braking member 4 that is fixed to the casing 15.

Figure 2:
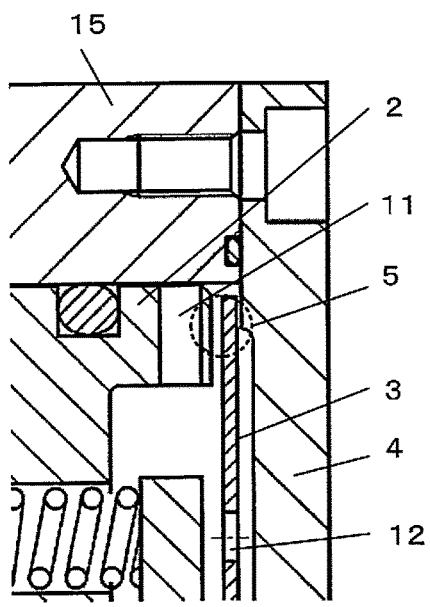
FIG. 2 is a partially cross-sectional view of FIG. 1.

FIG. 2 is a partially cross-sectional view of FIG. 1. Reference Sign 5 indicates the unclamped state. In the unclamped state 5, a minute gap is formed between the braking member 2 and the brake disk 3 and between the brake disk 3 and the target braking member 4 in a non-contact state. When air for air purging as a gas supplied from a purge air supply port 1 (see FIG. 1) passes through the gap, the air purging is performed on the entire clamping mechanism. For this reason, since a space which is not subjected to the air purging is not formed inside the casing 15 including the clamping mechanism, it is possible to prevent the cutting fluid from intruding into the rotation table device 100.

Figure 3:
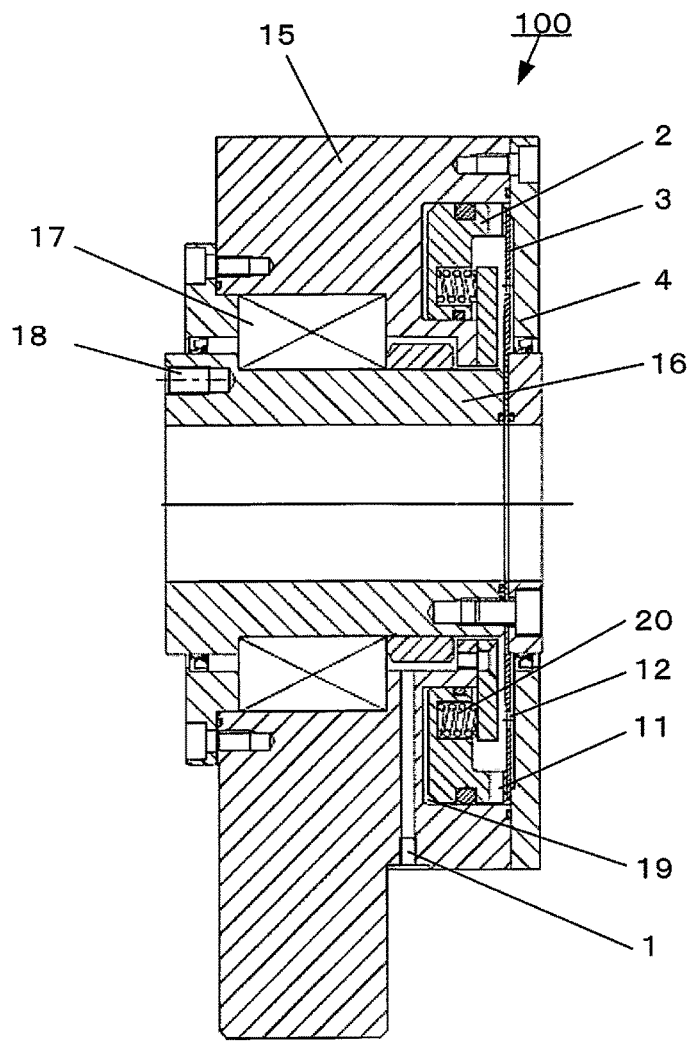
FIG. 3 is a view illustrating a cross-section of the rotation table device of the embodiment of the invention (a clamped state)
Figure 4:
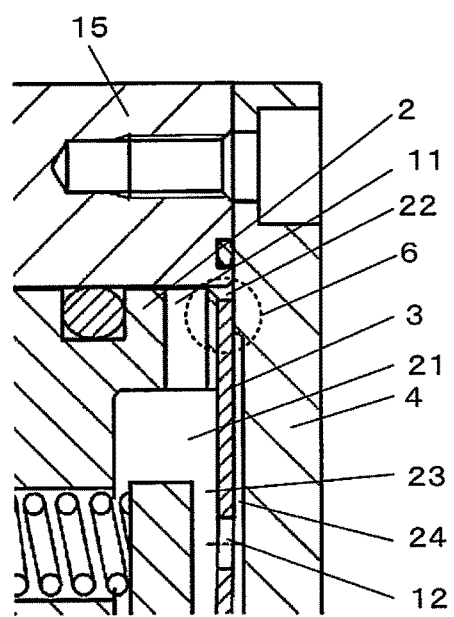
FIG. 4 is a partially cross-sectional view of FIG. 3.

FIG. 3 is a view illustrating a cross-section of the rotation table device of the embodiment (a clamped state). FIG. 4 is a partially cross-sectional view of FIG. 3. Reference Sign 6 indicates the clamped state. In the clamped state, the braking member 2 that is configured as a piston or a diaphragm is moved toward the target braking member 4 by a fluid such as oil or air, and hence the brake disk 3 fixed to the rotation member 16 is pressed against the target braking member 4 fixed to the casing 15 of the rotation table device 100. Further, since a fluid is supplied from a fluid supply port (not illustrated) for air or oil to the space 19, the braking member 2 may be moved toward the target braking member 4. In order to return to the unclamped state, a fluid is discharged from the space 19, and the braking member 2 is moved backward from the target braking member 4 by the extension force of a spring 20.

In the embodiment, the target braking member 4 is provided with a first communication portion (an air passage) 11 and the brake disk 3 is provided with a second communication portion (an air passage) 12 so that the air purging is performed on the entire area of the clamping mechanism of the rotation table device 100 regardless of the clamped state and the unclamped state. Accordingly, even when the braking member 2 and the brake disk 3 contact each other and the brake disk 3 and the target braking member 4 contact each other by the clamping operation, an air passage used for the communication of the space inside the clamping mechanism is ensured, and hence the purge air is applied to the entire contact portion.

Further, the purge air is supplied from the purge air supply port 1 into the rotation table device 100.

The configuration in which the purge air is supplied from the purge air supply port 1 into the rotation table device 100 corresponds to a pressure adjustment unit that maintains the pressure inside the casing so as to be higher than the atmospheric pressure by the air supplied from the purge air supply port in order to prevent the intrusion of the cutting fluid. Further, the first communication portion 11 is a groove or a hold that causes an inner space 21 of the contact surface to communicate with an outer space 22 of contact surface between the braking member 2 and the brake disk 3. The second communication portion 12 is a hole or a notch which causes a space 23 near the braking member of the brake disk to communicate with a space 24 near the target braking member of the brake disk.

Figure 5:
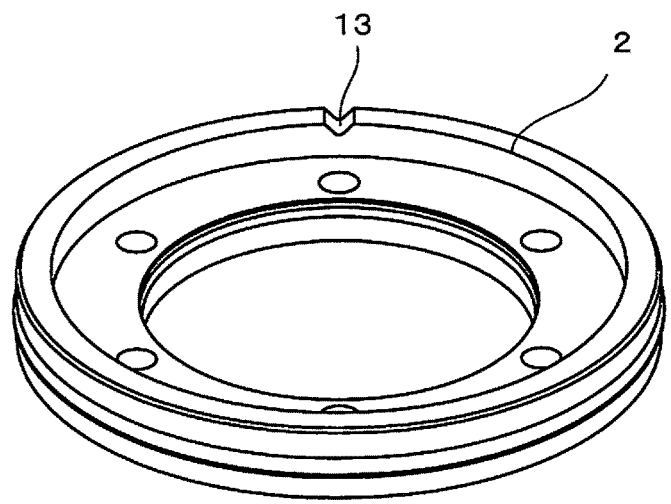
FIG. 5 is a kind of a braking member used in the embodiment of the invention.

Here, an example of the first communication portion 11 will be described with reference to FIG. 5. FIG. 5 is a kind of the braking member used in the embodiment. In the braking member 2, a communication groove 13 is provided in the outer peripheral portion of the braking member configured as a piston or a diaphragm and contacting the brake disk 3 fixed to the rotation member 16. A hole may be provided instead of the communication groove 13. The communication groove 13 corresponds to the first communication portion.

Figure 6:
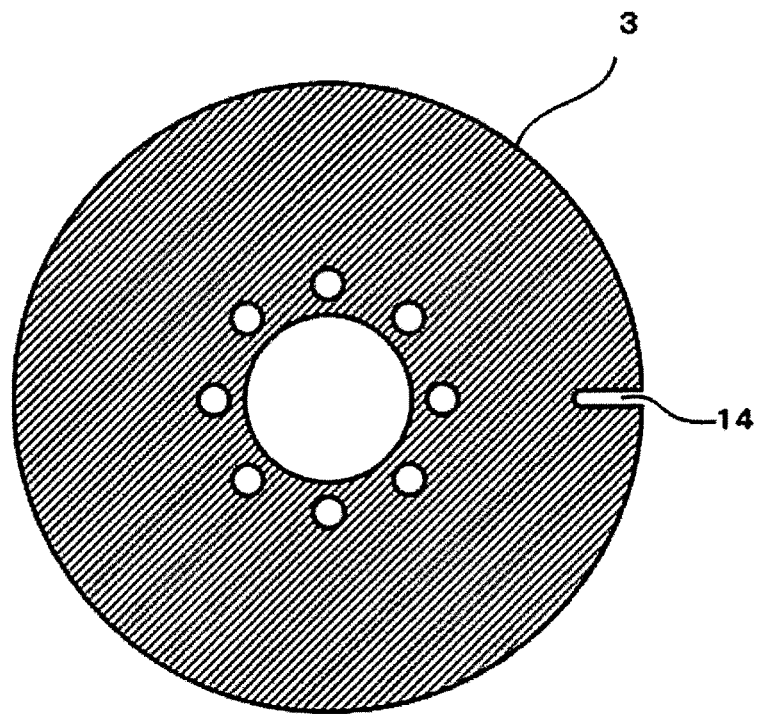
FIG. 6 is a kind of a brake disk used in the embodiment of the invention.
Figure 7:
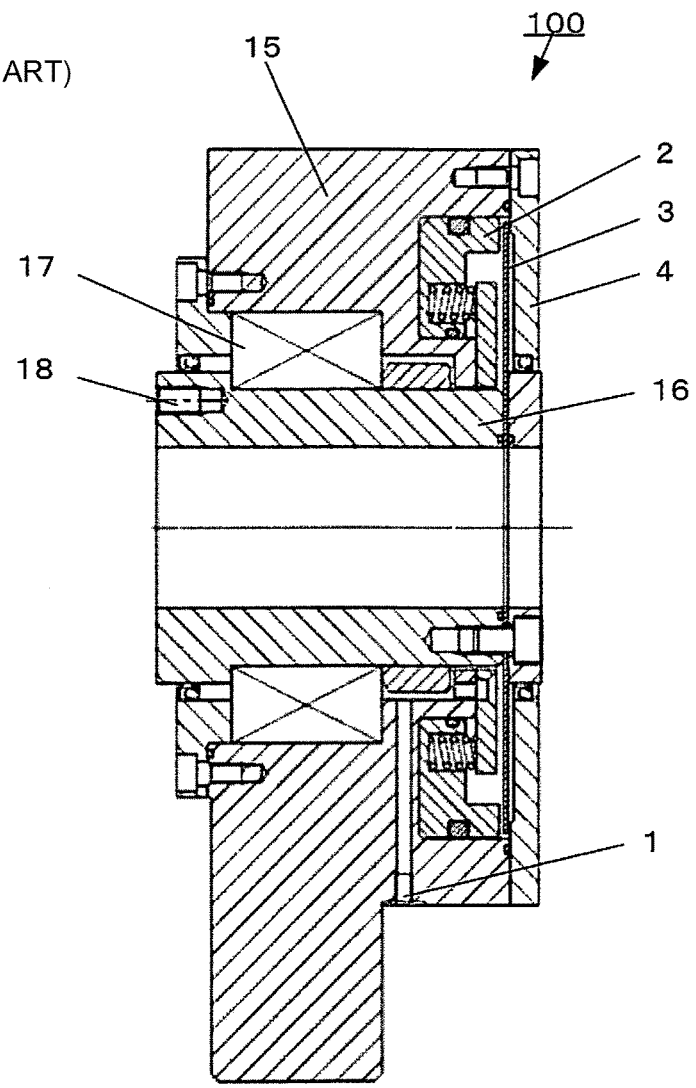
FIG. 7 is a view illustrating a cross-section of a rotation table device of the related art (an unclamped state)
Figure 8:
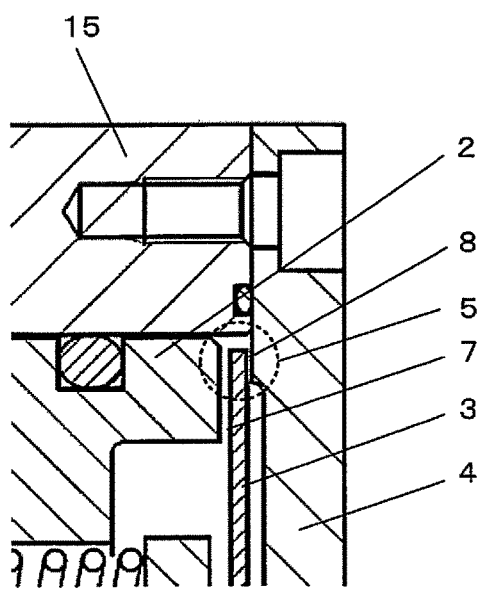
FIG. 8 is a partially cross-sectional view of FIG. 7.
Figure 9:
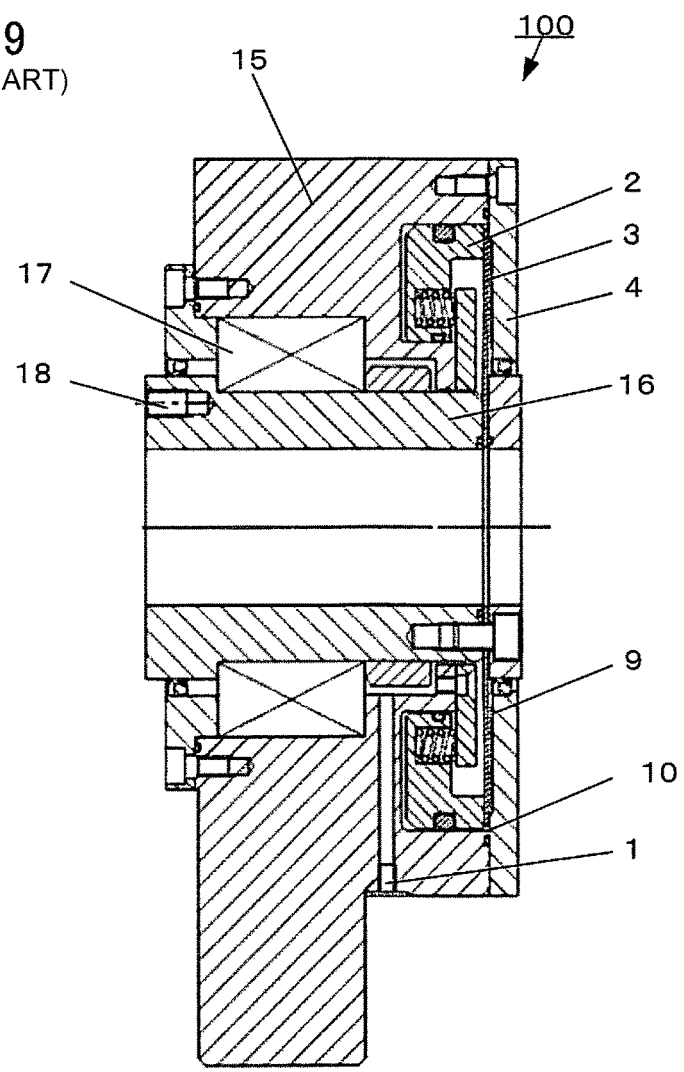
FIG. 9 is a view illustrating a cross-section of the rotation table device of the related art (a clamped state)
Figure 10:
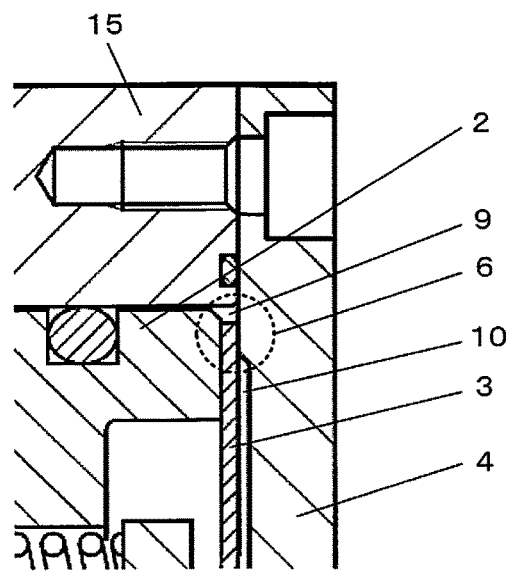
FIG. 10 is a partially cross-sectional view of FIG. 9.

Next, an example of the second communication portion 12 will be described with reference to FIG. 6. FIG. 6 is a kind of the brake disk used in the embodiment. A notch 14 is provided in the brake disk 3 contacting the target braking member fixed to the casing 15. A hole may be provided instead of the notch. The notch 14 corresponds to the second communication portion.

The invention claimed is:
1. A rotation table device, comprising:
a casing;
a pressure adjustment unit configured to maintain a pressure inside the casing to be higher than the atmospheric pressure by air supplied from a purge air supply port, and to prevent the intrusion of a cutting fluid; and a rotation member rotatably supported by the casing;

a work attachment portion at one end of the rotation member; and a clamping mechanism configured to prohibit the rotation of the rotation member;

wherein the clamping mechanism comprises:

a brake disk fixed to the rotation member; and a target braking member fixed to the casing, and a braking member including a contact surface and configured to be operated in the axial direction of the rotation member by air or working oil between a clamped and an unclamped state;

in the clamped state, the contact surface of the braking member presses the brake disk against the target braking member to fix a position of the work attachment portion, and in the unclamped state, the contact surface of the braking member is spaced from the brake disk to allow rotation of the work attachment portion, the braking member comprises:

a groove or a hole that allows the pressure inside the casing on opposite sides of the contact surface to be fluidly connected and maintained higher than the atmospheric pressure in both the clamped and unclamped states.

2. A rotation table device, comprising:

a casing;

a pressure adjustment unit configured to maintain a pressure inside the casing to be higher than the atmospheric pressure by air supplied from a purge air supply port and to prevent the intrusion of a cutting fluid; and a rotation member rotatably supported by the casing;

a work attachment portion at one end of the rotation member, and a clamping mechanism configured to prohibit the rotation of the rotation member;

wherein the clamping mechanism comprises:

a brake disk fixed to the rotation member; and a target braking member fixed to the casing, and a braking member including a contact surface and configured to be operated in the axial direction of the rotation member by air or working oil between a clamped and an unclamped state;

in the clamped state, the contact surface of the braking member presses the brake disk against the target braking member to fix a position of the work attachment portion, and in the unclamped state, the contact surface of the braking member is spaced from the brake disk to allow rotation of the work attachment portion, the brake disk comprises:

a hole or a notch that allows the pressure inside the casing on opposite sides of the brake disk to be fluidly connected and maintained higher than the atmospheric pressure in both the clamped and unclamped states.

3. A rotation table device, comprising:

a casing;

a pressure adjustment unit configured to maintain a pressure inside the casing to be higher than the atmospheric pressure by air supplied from a purge air supply port and to prevent the intrusion of a cutting fluid; and a rotation member rotatably supported by the casing;

a work attachment portion at one end of the rotation member, and a clamping mechanism configured to prohibit the rotation of the rotation member;

wherein the clamping mechanism comprises:

a brake disk fixed to the rotation member; and a target braking member fixed to the casing, and a braking member including a contact surface and configured to be operated in the axial direction of the rotation member by air or working oil between a clamped and an unclamped state;

in the clamped state, the contact surface of the braking member presses the brake disk against the target braking member to fix a position of the work attachment portion, and in the unclamped state, the contact surface of the braking member is spaced from the brake disk to allow rotation of the work attachment portion, the braking member comprises:

a groove or a hole that allows the pressure inside the casing on opposite sides of the contact surface to be fluidly connected and maintained higher than the atmospheric pressure by air supplied from the purge air supply port and prevent the intrusion of the cutting fluid in both the clamped and unclamped states;

the brake disk comprises:

a hole or a notch that allows the pressure inside the casing on opposite sides of the brake disk to be fluidly connected and maintained higher than the atmospheric pressure in both the clamped and unclamped states.

* * * * *